United States Patent [19]

Rettig et al.

[11] Patent Number: 4,518,046
[45] Date of Patent: May 21, 1985

[54] MULTIPLE IMPLEMENT HITCH AND TRANSPORT

[75] Inventors: Vernon E. Rettig, Bondurant; Marvin L. Bigbee; Ronald M. Steilen, both of Ankeny; Glenn D. Head, Jr., Des Moines, all of Iowa

[73] Assignee: Deere & Company, Moline, Ill.

[21] Appl. No.: 390,435

[22] Filed: Jun. 21, 1982

[51] Int. Cl.³ .............................................. A01B 73/00
[52] U.S. Cl. ..................................... 172/311; 172/443; 172/447; 172/449; 280/411 A
[58] Field of Search ............... 172/311, 446, 456, 662, 172/776, 449, 439, 443, 448, 198, 624, 624.5, 502, 447; 56/228, 385; 111/57; 280/411 R, 411 A, 411 B, 411 C, 412, 413, 656

[56] References Cited

U.S. PATENT DOCUMENTS

| 3,791,673 | 2/1974 | Hornung | 172/311 X |
|---|---|---|---|
| 3,982,773 | 9/1976 | Stufflebeam et al. | 172/456 X |
| 4,137,852 | 2/1979 | Pratt | 172/311 X |
| 4,171,022 | 10/1979 | Applequist | 172/456 X |
| 4,172,537 | 10/1979 | Gandrud et al. | 172/311 X |
| 4,214,637 | 7/1980 | Applequist | 172/484 |
| 4,236,585 | 12/1980 | Adee et al. | 172/311 X |
| 4,272,097 | 6/1981 | Cornelius | 280/411 A |
| 4,299,292 | 11/1981 | Hughes | 172/311 |
| 4,319,643 | 3/1982 | Cartel et al. | 172/311 |
| 4,364,581 | 12/1982 | Shoup | 172/311 X |
| 4,402,367 | 9/1983 | Couser | 172/311 X |

FOREIGN PATENT DOCUMENTS 883646 12/1961 United Kingdom ............... 172/439

OTHER PUBLICATIONS

Crust Buster Folding Grain Drill the affordable portables–Form No. 8212-74, American Products, Inc./Spearville, KS 67876, May, 1977.

Primary Examiner—Richard T. Stouffer

[57] ABSTRACT

A two-wheeled trailer hitch supporting two three-point hitch mounted implements side-by-side for field operation. The implements are mounted on outriggers which are foldable forwardly to narrow the unit for transport. A pair of rigid diagonal drag links movable fore-and-aft by a cylinder-activated slide block is connected to the outriggers for pivoting them approximately ninety degrees between the field and transport positions. Lift frame structures selectively engage the three-point hitch linkages to raise the implements on the respective outriggers. The lift frame structure is disengaged from the linkages when the implements are lowered for greater flexibility in the field-working position.

33 Claims, 4 Drawing Figures

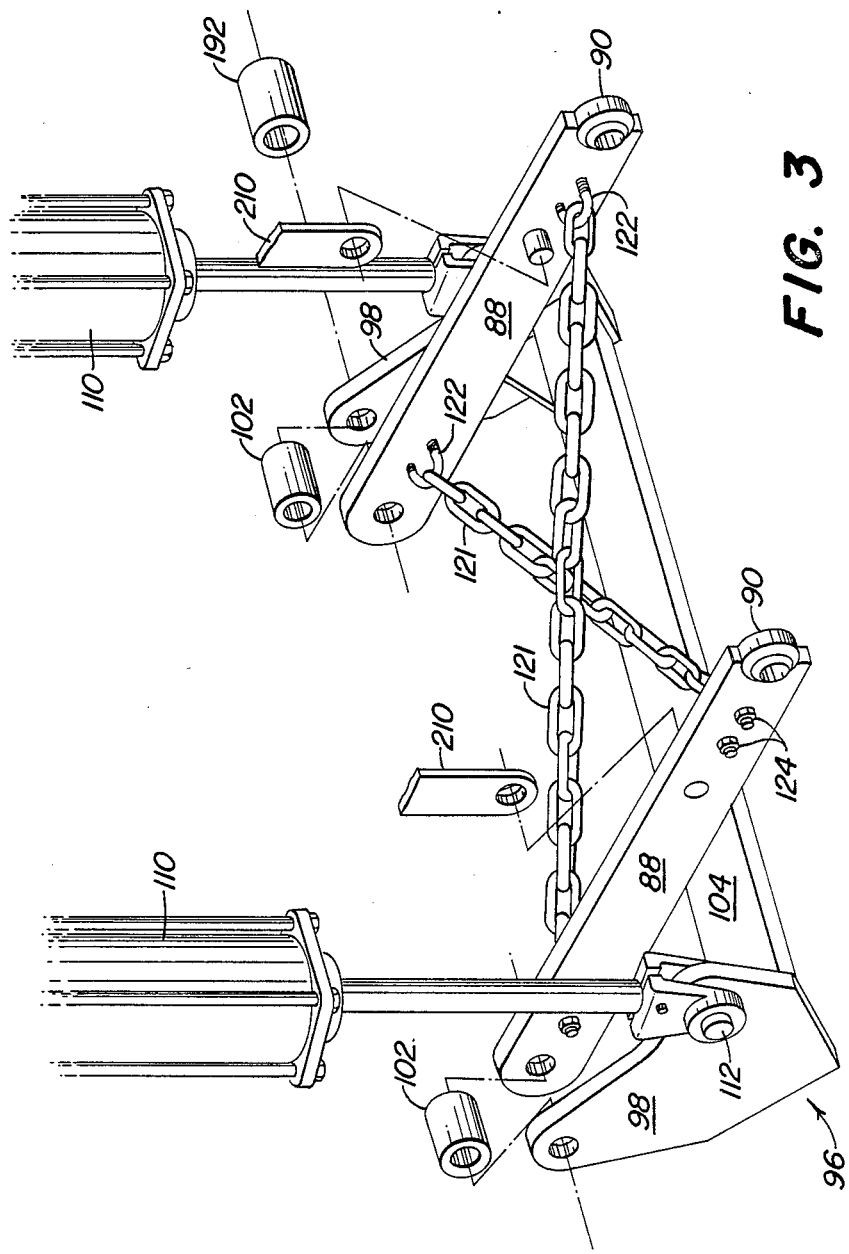

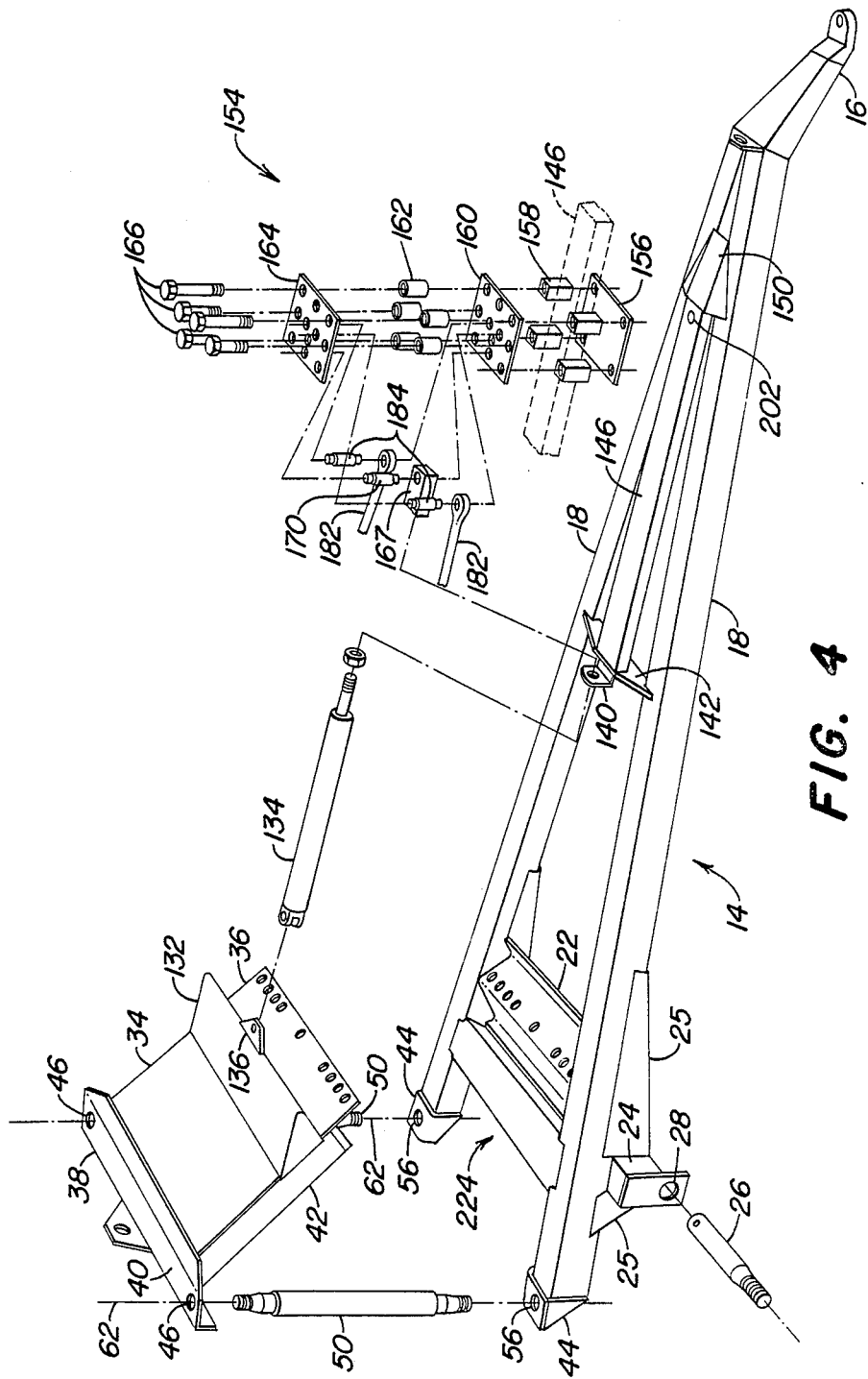

MULTIPLE IMPLEMENT HITCH AND TRANSPORT

BACKGROUND OF THE INVENTION

The present invention relates generally to agricultural implements, and more specifically to multiple implement hitches which fold between a wide field-working configuration and a narrower transport configuration.

As tractor size and horsepower increase, wider agricultural implements have been introduced to increase productivity. Since the field-working widths of many of the implements are greater than acceptable transport and storage widths, folding frames or hitches have become necessary. Examples of typical folding frame or hitch structure may be found in U.S. Pat. Nos. 3,791,673, 4,214,637 and 4,272,097.

For the most part, prior art folding structures have been relatively bulky and complex. Many have included telescoping or centrally hinged diagonal beams which require accurate alignment and which can bind or buckle under heavy loading, such as when the structures are folded or stopped suddenly while supporting fully loaded grain drills or the like. Some of the prior art structures also require the supported implements to be connected at their innermost ends, either to each other or to the frame or hitch itself, and such connection can limit flexibility and cause uneven planting or tillage in rough terrain. Height variations of the structure, such as result when the wheels supporting the frame or hitch encounter rough field conditions, are commonly transmitted directly to the attached implements.

Another disadvantage of some prior art folding equipment is that the attached implements must be specifically designed or modified for attachment to the structure, and therefore an individual implement cannot be conveniently disconnected and used separately behind a tractor for smaller jobs. Often a farmer having a conventional implement either must extensively modify that implement or, alternatively, buy all new implements for use with a particular folding frame or hitch. Although some prior art structures are available to mount conventional implements, these tend to be quite complex. Those such as exemplified in the aforementioned U.S. Pat. No. 4,272,097 require a pair of running gear which reorient as the structure changes between transport and field-working positions.

It is therefore an object of the present invention to provide an improved hitch for supporting agricultural implements in a side-by-side configuration for use in the field and in a folded configuration for transport.

It is yet another object to provide a hitch which overcomes many of the problems associated with the prior art structures.

It is yet another object to provide a hitch which is simpler in structure, stronger and less expensive to manufacture than at least some of the prior art hitches.

It is a further object of the invention to provide a folding multiple implement hitch which receives an existing implement without extensive modification. It is another object to provide such a hitch which accepts a conventional three-point hitch mounted implement.

It is still another object of the invention to provide a multiple implement hitch having an improved lift arrangement for positively raising and supporting the implements during transport and for providing increased flexibility in the field. It is a further object to provide such a hitch which obviates complicated folding or telescoping members and which utilizes simple wheel structure.

In accordance with the above objects, a two-wheeled trailer hitch is supported for forward movement over the ground by a pair of rearwardly mounted ground-engaging wheels. Outriggers are pivotally mounted at the rear of the hitch for swinging between transversely outwardly extending positions and forwardly extending positions. The outward ends of the outriggers carry connecting structure adapted for connection to the existing three-point hitch structure on the implements. Hydraulically operated lift frames raise and lower the implements between upper transport positions wherein the implements are carried on the respective outriggers, and lower ground-engaging positions. In the lower ground-engaging position, the lift frame permits the individual implements to move independently over rough terrain. To narrow the structure for transport, the implements are raised on their respective outriggers, and the outriggers are pivoted forwardly approximately ninety degrees by a pair of rigid diagonal links connected to a hydraulically actuated slide block. A fore-and-aft cylinder is extended to move the slide block forwardly and pull the outriggers to a position adjacent hitch beams. Brackets located on the hitch beams mate with support rollers adjacent the lift frame as the structure is folded and provide support near the ends of the outriggers during transport. A safety pin locks the slide block in position during transport to prevent unfolding.

The connecting structure permits conventional implements to be quickly and easily attached to or removed from the hitch. The lift frames provide positive lifting action for the implements while permitting flexibility in the field-working position. The hydraulically operated folding structure permits the use of rigid diagonal braces rather than telescoping or folding braces which reduces the cost and complexity of the unit while providing added strength to resist buckling, particularly when fully loaded grain drills or the like are supported on the hitch.

These and other objects, features and advantages of the present invention will become apparent to one skilled in the art from the description below when taken with the drawings.

BRIEF DESCRIPTION OF THE DRAWINGS

FIG. 3 is a perspective view of the lift frame assembly and the two lower connecting links of the three-point linkage connecting the implement with the hitch.

FIG. 4 is an exploded view of a portion of the hitch structure shown in FIGS. 1 and 2.

DESCRIPTION OF THE PREFERRED EMBODIMENT

Figure 1:
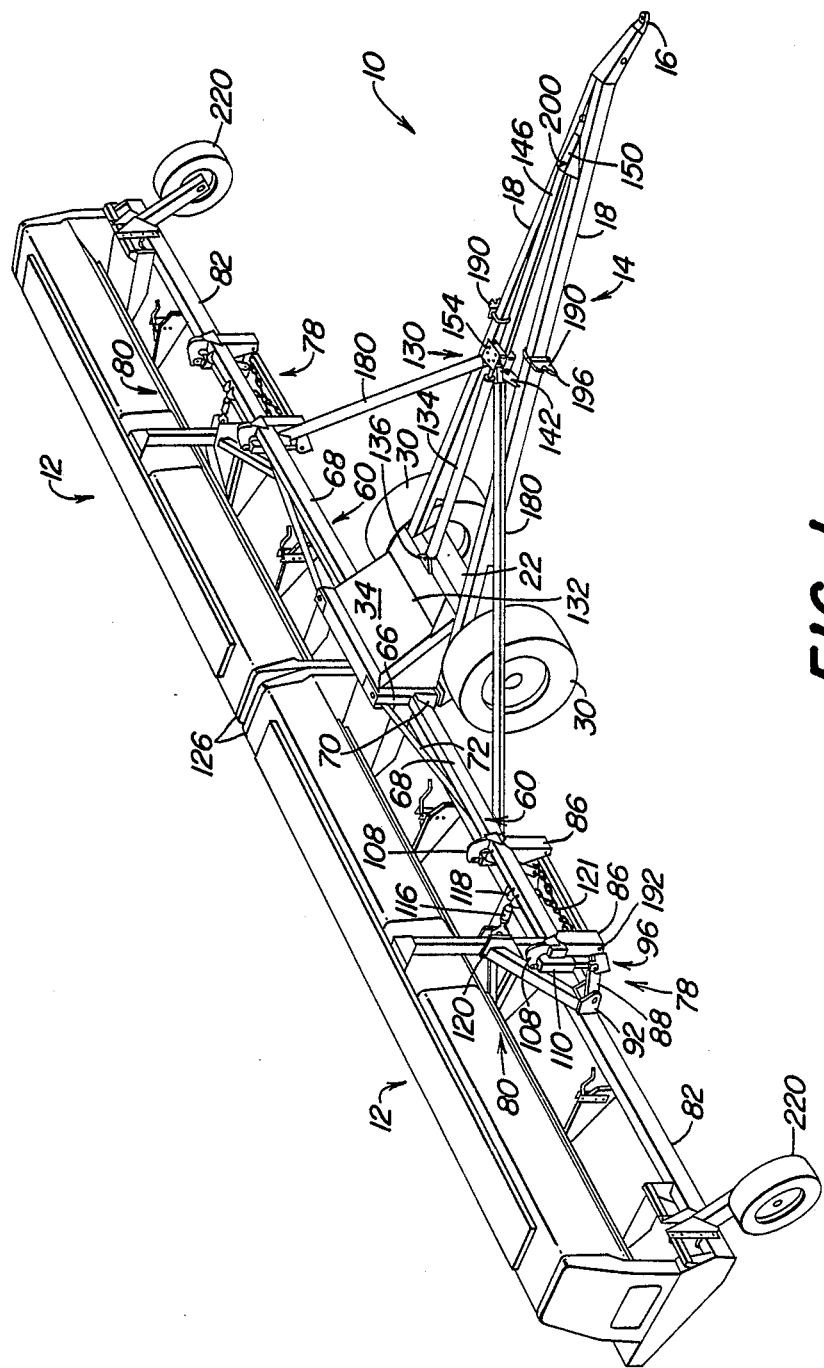
FIG. 1 is a pictorial view of the hitch of the present invention with two grain drills attached to the outriggers which are shown in the field-working position.

Referring now to FIG. 1, therein is shown the transport hitch or cart 10 of the present invention, supporting a pair of identical three-point hitch mounted grain drills 12 in side-by-side relationship for forward movement through a field. The transport hitch 10 includes a main frame 14 having a forward towing connection 16 adapted for connection to a tractor or other towing vehicle (not shown). The towing connection 16 extends upwardly in the rearward direction to a connection with a pair of rearwardly diverging tubular hitch beams 18. The hitch beams 18 are connected adjacent their rearward ends by lower connecting structure 22. An axle support beam 24 extends transversely outwardly of each hitch beam 18 and is welded to the beam and to reinforcing plates 25 (FIG. 4). A pair of spindles 26 extend through and are supported by brackets 28 welded to opposite ends of the beam 24. The innermost ends of the spindles 26 are connected to the lower portion of the beam 24 by brackets or other suitable structure. A pair of wheels 30 (FIG. 1) are rotatably mounted on the spindles 26 and support the main frame 14 generally horizontally above the ground.

A rearwardly inclined structural member 34 includes a lower forward section 36 bolted to the lower connecting structure 22 between the hitch beams 18. The inclined structure 34 extends rearwardly and upwardly and is welded to an angle 38 having a generally horizontal top portion 40. Reinforcing channel sections 42 are welded to the structure 34 and angle 38.

A pair of pivot support brackets 44 are welded to the aft ends of the hitch beams 18 directly below pivot-receiving holes 46 located in the top portion 40 of the angle 38. Parallel upright pivots 50 are supported between the respective pivot support brackets 44 and the top portion 40 of the angle 38. Threaded ends of the pivots 50 extend through the holes 46 and holes 56 and the brackets 44.

Figure 2:
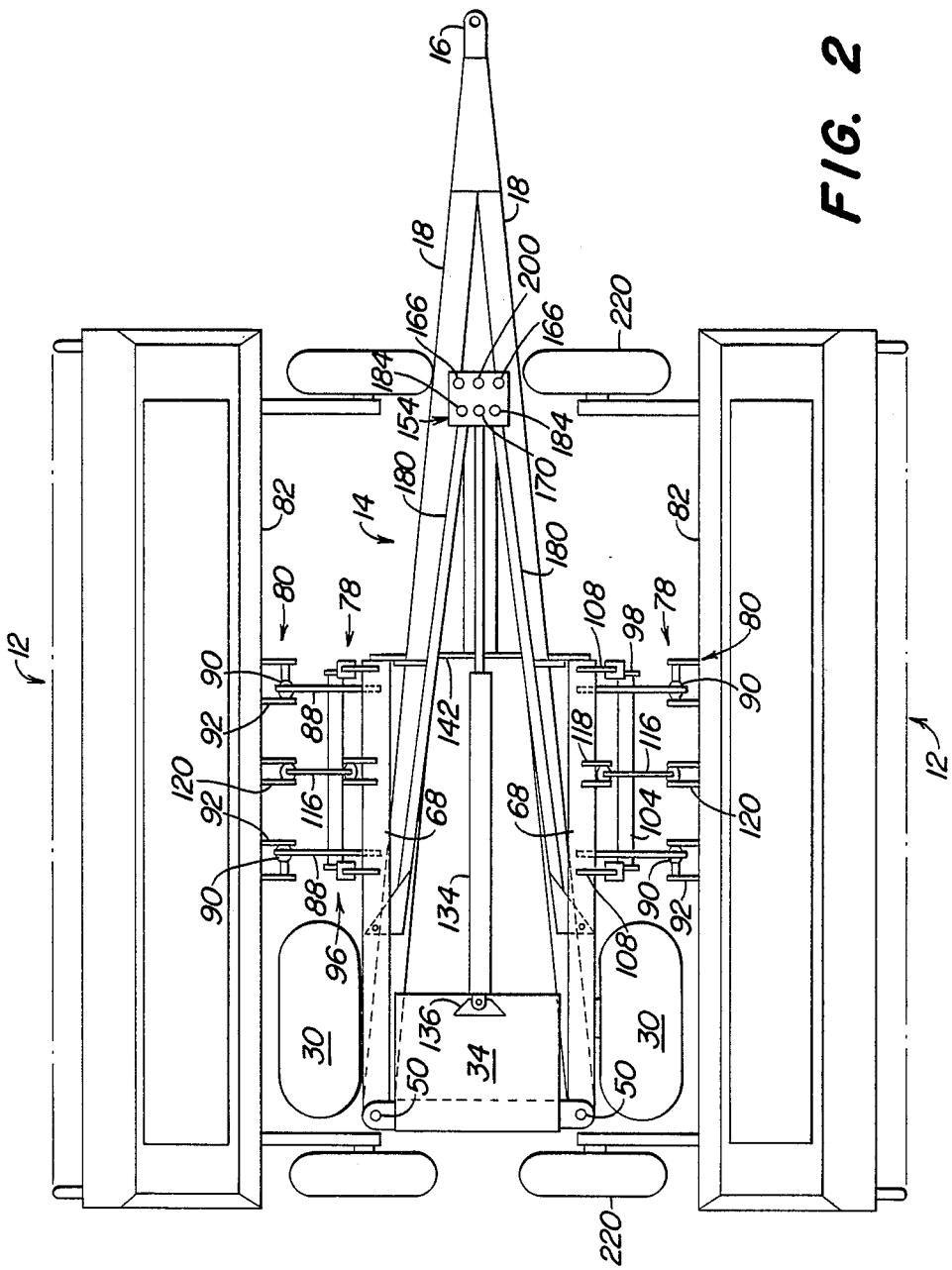
FIG. 2 is a top view showing the hitch in the folded or transport position.

Outriggers 60 are connected to the main frame 14 for pivoting about upright axes 62 of the pivots 50 between outwardly extending field-working positions (FIG. 1) and forwardly folded transport positions (FIG. 2). Each outrigger includes an upright tubular post 66 received by the corresponding pivot 50 between the angle 38 and the pivot support bracket 44. A pair of conventional bearing assemblies (not shown) located at the top and the bottom of each of the posts 66 permit the posts to pivot about the axes 62. A horizontal tubular beam 68 is welded at its radially innermost end to the lower portion of the tubular post 66. Gussets 70 are welded between the posts 66 and the beam 68. A diagonal brace 72 extends between the upper portion of the tubular posts 66 and the center portion of the beam 68. The gussets 70 and the brace 72 provide the support necessary to maintain the beam 68 in a substantially horizontal attitude when the beam is loaded by a relatively heavy implement. The inclined structure 34 and the angle 38 maintain the axes 62 upright and parallel to each other.

Three-point linkage type connecting structure 78 is located at the radially outward end of each outrigger 60 and mates with conventional three-point hitch structure 80 carried by the implement main frame 82. Each three-point connecting structure 78 includes a pair of transversely spaced drops 86 (FIG. 1) welded to the beam 68. The drops 86 are channel-shaped and open rearwardly. A pair of lower links or arms 88 are pivotally connected to the respective drops 86 between the sides of the channel-shaped lower portion. The lower links 88 extend rearwardly from their pivotal connections with the drops 86 and terminate at their aft ends in ball joints 90 which are pinned to the two lower connecting points 92 of the three-point hitch connection on the implement 12.

A lift frame assembly 96 is also pivotally connected to the lower channel-shaped portions of the drops 86 for rocking about the same axis as the links 88. The lift frame assembly 96 includes a pair of transversely spaced side plates 98 which are located outwardly of the respective lower links 88 and are maintained in a spaced relationship with respect thereto by spacers 102 (FIG. 3). Welded to the inside faces of the plates 98 is a torsion member 104 which acts to constrain the plates 98 to pivot in unison. Cylinder bracket 108 is welded to the top of the beam 68 above each of the drops 86 and extends rearwardly therefrom. Hydraulic cylinders 110 are connected at their anchor ends to the respective cylinder brackets 108 and extend downwardly therefrom to a rod connection 112 with the aft ends of the plates 98. An adjustable link 116 (FIG. 1) is connected between an upper bracket 118 welded to the beam 68 between the cylinder brackets 108. The aft end of the link 116 is connected to a bracket 120 which forms the upper connecting point of the three-point hitch structure 80 on the implement 12.

The cylinders 110 for each lift frame assembly 96 preferably are single-acting and are connected in parallel to a source of pressurized fluid on the towing vehicle. As the cylinders 110 are retracted by directing fluid into the rod ends, the lift frame assembly 96 rocks upwardly about its pivotal connection with the drops 86, and the torsion member 104 contacts the lower edge of the lower links 88 to rock the links upwardly about the same pivots. Continued retraction of the cylinders 110 raises the implement 12 until the entire weight of the implement is supported on the outriggers 60. The torsion member 104 of the lift frame assembly 96 constrains the cylinders 110 to act substantially in unison so that the implement is lifted in a level attitude. The upper toggle link 116 maintains the desired fore-and-aft slope of the implement as it is raised and lowered. The length of the link 116 is adjustable to vary the slope as necessary.

To lower the implement into a ground-working position, the cylinders 110 are extended by permitting fluid to flow from the rod ends so that the lower links 88 rock downwardly. The cylinders 110 have sufficient stroke to permit the torsion member 104 to be lowered beyond the normal field-working positions of the lower links 88 so that the links may rock freely up and down as variations in surface contour are encountered by the implement 12. The links 88 can move up and down with respect to each other and with respect to the torsion member 104. To prevent side sway of the implement 12, sway brace chains 121 are connected diagonally between opposite ends of the lower links 88 (FIG. 3). The chains 121 are adjustably connected to the links 88 by U-bolts 122. By adjusting nuts 124 on the U-bolts 122 the tension in the chains can be varied.

The three-point linkage connecting structure 78 is located radially outwardly from the fore-and-aft centerline of the transport hitch 10 so that the radially innermost ends of the adjacent implements 12 are closely adjacent each other (FIG. 1). To provide maximum flexibility of the structure in the field, the ends 126 are not tied together or directly to the transport hitch. In the preferred embodiment, rub plates (not shown) are added to the ends 126 to prevent damage to the implements 12 when they move vertically relative to each other while in contact.

Hydraulically operated folding structure, indicated generally at 130, is provided for rocking the outriggers 60 between the transversely outwardly extending position shown in FIG. 1 and the forwardly folded transport postion shown in FIG. 2. A cylinder support member 132 is welded to the forward face of the inclined structure 34 just above the level of the beams 18. An elongated hydraulic cylinder 134 has an anchor end connected to a bracket 136 which in turn is welded to the forward edge of the member 132. The cylinder 134 is supported in a generally horizontal and fore-and-aft attitude by the bracket 136 and by a forward bracket 140 which is centrally located between the hitch beams 18. The bracket 140 is welded to a transverse upright plate 142 which in turn is welded to the hitch beams 18. A slide tube 146 is centrally located between and above the hitch beams forwardly of the plate 142. The aft end of the slide tube 146 is welded to the plate 142, and the forward end of the tube 146 is supported adjacent the forward ends of the hitch beams 18 by a wedge-shaped member 150. The forward bracket 140 loosely supports the forward cylinder end of the hydraulic cylinder 134 and positions the cylinder so that the rod, as it is extended and retracted, moves generally parallel to and directly above the slide tube 146.

A slide block assembly 154 is constrained for fore-and-aft motion along the slide tube 146. The slide block assembly 154 includes a lower plate 156 positioned below the slide tube 146 and two pairs of square upright spacers 158 positioned on either side of the tube 146. An intermediate plate 160 is positioned on top of the square spacers 158 directly above the top surface of the slide tube 146. Circular spacers 162 are positioned between the intermediate plate 160 and a top plate 164. The plates are secured in generally parallel relationship by bolts 166 or other suitable means.

The rod end of the cylinder 134 is threaded into a connecting block 167 which in turn is connected between the top plate 164 and the intermediate plate 160 by a pin 170 which extends through centrally located apertures in the rearward sections of the respective plates. The square spacers 158 fix the angular position of the slide block assembly 154 with respect to the center-line of the main frame 14 while permitting the assembly to slide fore-and-aft on the tube 146 as the cylinder 134 is extended and retracted.

The folding structure 130 also includes a pair of rigid diagonally extending drag links 180. The aft ends of the drag links are pivotally connected to the respective outriggers 60 adjacent the innermost drops 86. Eyebolts 182 are threaded into the forward ends of the drag links 180 and are pivotally connected between the top and intermediate plates 164 and 160 of the slide block assembly 154 by a pair of upright pins 184. The eyebolts 182 may be threaded into or out of the ends of the drag links 180 to adjust the length of the links.

An outwardly extending roller-receiving bracket 190 (FIG. 1) is connected to each of the respective beams 18 forwardly of the plate 142. The brackets 190 are offset radially from the pivotal axes 62 a distance approximately equal to but slightly greater than the radial distance of the outermost drop 86 from the axes. A roller 192 (FIG. 3) is supported on each outer drop 86 by a pin which also acts as the pivot pin for the outer plate 98 and outer lower link 88. The bracket 190 includes an inclined roller-receiving surface 196 which mates with the roller 192 as the implement is folded toward the position shown in FIG. 2. The bracket 190 supports the end of the outrigger 60 when in the transport position. The bracket 190 is adjustable up and down and fore-and-aft on the beam 18 to permit accurate alignment with the roller 192.

To fold the transport hitch 10 from the field-working position shown in FIG. 1 to the transport position shown in FIG. 2, the implements 12 are first raised upon the three-point hitch linkage connecting structure 78 by retracting the cylinders 110 to cause the torsion member 104 to contact the lower links 88 and pivot them upwardly. The implements are raised off of the ground and are supported entirely from the outriggers 60. The hydraulic cylinder 134, which is connected to a source of hydraulic fluid pressure on the tractor, is then extended to move the slide block 154 forwardly over the slide tube 146 to thereby pull the drag links 180 forwardly and pivot the outriggers 60 about the upright axes 62. The cylinder 134 is extended until the drag links 180 have pivoted the outriggers 60 approximately ninety degrees forward from their field-working position. The beams 68 are supported by the tubular post 66 above the level of the top of the wheels 30 so that the beams move inwardly over the wheels. In the transport position of FIG. 2 the outriggers 60 are located inwardly of the inside edges of the wheels 30. The connecting structure 78 offsets the forward portion of the implement 12 from the beam 68 so that there is no interference between the implement and the outer edge of the wheel 30.

To prevent the transport hitch 10 from inadvertently moving out of the transport position shown in FIG. 2, a transport lock pin 200 is inserted through holes in the slide block assembly 154 and through a hole 202 in the forward end of the slide tube 146. Even if the operator accidently moves the hydraulic control to retract the cylinder 134, the pin 200 will prevent the slide block assembly 154 from sliding over the tube 146. To move the implements 12 to the field-working position, the transport pin 200 is removed and the cylinder 134 is retracted to pivot the outriggers 60 rearwardly.

A lift securement strap 210 is secured to the beam 68 directly above each of the lower links 88. After the lift frame assembly 96 has raised the implement 12 out of the ground-working position to an upper transport position, the straps 210 are connected to brackets or stud pins on the links 88 (FIG. 3) to secure the implement in the upper position.

In the preferred embodiment, the implements 12 are grain drills having forwardly extending gauge or ground-engaging wheels 220. In the transport position, the gauge wheels 220 are raised out of contact with the ground. The innermost gauge wheel 220 is tucked behind the corresponding wheel 30 and the outermost gauge wheel is closely adjacent the forward portion of the main frame 14 for compact transport (FIG. 2). In the field-working position of FIG. 1, the innermost gauge wheels 220 are conveniently received in an accommodation space 224 (FIG. 4) between the aft ends of the beams 18 and below the inclined structure 34.

Having described the preferred embodiment, it will be apparent that modifications can be made without departing from the scope of the invention as defined in the accompanying claims.

We claim:

1. An implement hitch for supporting two agricultural implements side-by-side in the field, the hitch comprising: a fore-and-aft extending main frame including forward connecting means adapted for connection to a towing vehicle, a fore-and-aft extending hitch member extending rearwardly from the forward connecting means; a ground wheel assembly connected to the main frame and supporting the main frame for forward movement over the ground; first and second support arms, each arm having radially inward and outward ends; means pivotally connecting the radially inward ends of the support arms to the aft end of the main frame for swinging about upright axes between first positions wherein the outward ends extend transversely outwardly in opposite directions from the transverse frame structure and a second position wherein the arms extend forwardly from said frame structure; vertically positionable connecting structure carried by each support arm outwardly of the respective inward end, each connecting structure adapted for receiving one of the agricultural implements; power means for positioning the connecting structure, when said implements are attached, to raise and lower the implements between a lower ground-engaging position and an upper position wherein the weight of the implements is carried primarily by the ground wheel assemblies; means for pivoting the support arms between the first and second positions to move the implements between a transversely extending field-working position and a folded position, said means including extendable and retractable cylinder means having one end fixedly connected to the main frame and an opposite end movable fore-and-aft, a pair of rigid links, each link having a forward end connected for movement fore-and-aft with the cylinder means, and a rearward end, and means connecting the rearward ends of the links to the respective arms outwardly of the inward ends of the arms for swinging the arms between the first and second positions as the cylinder means is extended and retracted; and wherein the ground wheel assembly comprises two ground-engaging wheels, one supported forwardly and transversely outwardly of each support arm pivotal connecting means.

2. The invention as set forth in claim 1 further comprising a fore-and-aft extending slide tube connected to the main frame; a slide member slidably received by the tube for fore-and-aft movement with respect thereto, means for connecting the forward ends of the rigid links to the slide member, and means connecting the cylinder means to the slide member for moving the latter fore-and-aft on the tube as the cylinder means is extended and retracted to move the rigid links.

3. The invention as set forth in claim 1 or 2 wherein the vertically positionable connecting structure includes two fore-and-aft extending link means connected between the respective support arm and the corresponding implement and rockable about a horizontal axis, transversely extending lift frame means adjustably supported below the link means and operably connected to the power means for adjustment thereby, said lift frame means for contacting the link means and raising and lowering the implements between the lower and upper positions and for supporting the implement on the respective arm when in the upper position, and said power means also for permitting the lift frame to be lowered generally out of contact with the link means when the implement is in the ground-working position for permitting free rocking of the link means with respect to the arm.

4. The invention as set forth in claim 3 wherein the connecting structure comprises a three-point hitch member and said two link means comprise two connecting points of said three-point hitch structure.

5. The invention as set forth in claim 2 wherein the main frame comprises a pair of beams diverging rearwardly from the connecting means, and wherein the slide tube is centrally located between the beams.

6. The invention as set forth in claim 1 or 2 wherein the main frame comprises a pair of beams diverging rearwardly from the connecting means, a pair of transversely spaced hinge members extending upwardly from the aft ends of the diverging beams and defining said upright axes, and a connecting structural member connected to the beams forwardly of the hinge members and angling rearwardly and upwardly to, and connected to, the upper ends of the hinge members.

7. The invention as set forth in claim 6 wherein the aft ends of the diverging beams and the diagonal structural member define an accommodation space for receiving therein portions of the two implements.

8. The invention as set forth in claim 1 further comprising bracket means connected to the main frame substantially fowardly of each upright axis for receiving and supporting the support arms adjacent the vertically positionable connecting structure when said arms are in the second position.

9. The invention as set forth in claim 8 including a roller member connected to the vertically positionable connecting structure, said bracket means including roller support structure for receiving said roller member as the arm is moved toward the second position.

10. A folding agricultural implement comprising: a transport hitch including fore-and-aft extending beam structure, wheel means for supporting the beam structure for forward movement over the ground, connector means located at the fore end of the beam structure and adapted for attachment to a towing vehicle, first and second generally horizontal outriggers having innermost and outermost ends, means hingedly connecting the innermost ends of the outriggers to the aft end of the beam structure for rocking about transversely spaced upright axes, said outriggers rockable between opposite transversely outward positions generally perpendicular to the forward direction and fore-and-aft extending positions adjacent to, and on laterally opposite sides of, the beam structure, wherein in the outward positions, the outermost ends are supported above the ground substantially entirely by the means hingedly connecting, first and second transversely extending implement sections having centrally located connecting structure; means attaching the connecting structure to the respective outermost ends of the outriggers; means for rocking the implement sections vertically on the outriggers between lower field-working positions and upper transport positions, wherein in the upper transport positions the implement sections are supported free from ground contact substantially entirely by the corresponding outrigger; and means rocking the outriggers horizontally between the outward and fore-and-aft positions when the implement sections are in the upper transport positions, said means comprising an extensible and retractable hydraulic cylinder supported on the transport hitch, an elongated slide member supported on the hitch and generally extending in the fore-and-aft direction, slide means connected to the hydraulic cylinder for fore-and-aft movement along the slide member as the cylinder is extended and retracted, and first and second link members having forward ends connected to the slide means, said link members including rearward ends pivotally connected to the first and second outriggers, respectively.

11. The invention as set forth in claim 10 wherein the means attaching the connecting structure to the outriggers comprises an arm pivotally connected between each outrigger and the corresponding implement, said arm rockable between first and second positions corresponding to the transport and ground-working positions, respectively, of the implement, and wherein the means for rocking the implements vertically comprises lift means for selectively engaging and rocking the arm, said lift means disengageable from said arm when the latter is in the second position for permitting free rocking of the arm.

12. The invention as set forth in claim 11 wherein lift means comprises a pair of transversely spaced plates supported for rocking on opposite sides of the arm, a torsion member located below the arm and connecting the plates for rocking in unison, and cylinder means for rocking the plates and causing said engagement and rocking of the arm.

13. The invention as set forth in claim 12 wherein the cylinder means comprises two hydraulic cylinders connected in parallel and constrained for extension and retraction in unison by the torsion member.

14. The invention as set forth in claim 10 wherein the link members are rigid and diverge outwardly in the rearward direction from the slide means, said pivotal connections of the rearward ends thereof located immediately adjacent the means attaching the connecting structure.

15. The invention as set forth in claim 10 or 14 further comprising means for locking the slide means in a preselected position corresponding to the fore-and-aft positions of the outriggers.

16. The invention as set forth in claim 15 wherein the slide means and slide member are apertured and said means for locking includes a pin insertable in said apertures.

17. The invention as set forth in claim 10 wherein when the outriggers are in the outward position, said implement sections are transversely aligned and the innermost ends of the sections are closely adjacent or in sliding contact with each other.

18. The invention as set forth in claim 10 or 17 wherein the implement sections include ground wheels located on the adjacent innermost ends of the sections and wherein the wheel means comprises a pair of transversely spaced wheels, said ground wheels located between said spaced wheels when the outriggers are in the transversely outward positions.

19. A folding agricultural implement comprising: a transport hitch including fore-and-aft extending beam structure, wheel means for supporting the beam structure for forward movement over the ground, connector means located at the fore end of the beam structure and adapted for attachment to a towing vehicle, first and second generally horizontal outriggers hingedly connected adjacent their innermost ends to the aft end of the beam structure for rocking about transversely spaced upright axes, said outriggers rockable between opposite transversely outward positions generally perpendicular to the forward direction and fore-and-aft extending positions adjacent to, and on laterally opposite sides of, the beam structure, first and second transversely extending implement sections; means connecting the implement sections to the respective outriggers; means for rocking the implement sections vertically on the outriggers between lower field-working positions and upper transport positions, wherein in the upper transport positions the implement sections are supported free from ground contact substantially entirely by the corresponding outrigger; and means rocking the outriggers horizontally between the outward and fore-and-aft positions when the implements are in the upper transport positions, said means connecting the implement sections to outriggers comprising a pair of transversely spaced lower links pivotally connected at one end to the outrigger and at the opposite end to the implement section, an upper link pivotally connected between the outrigger and the implement section generally between and above the lower links, and wherein said means rocking the implements vertically include a lift frame assembly pivotally connected to the outrigger for selective engagement with the lower links, and power means for rocking the lift frame assembly into engagement with the lower links.

20. The invention as set forth in claim 19 wherein the lift frame assembly includes a pair of rockable members pivotally connected to the outrigger for rocking about a pivotal axis common to said pivotal axis of the lower links, and a torsion member connected between the rockable members and constraining said members for rocking in unison, said torsion member extending under the lower links.

21. The invention as set forth in claim 20 wherein the power means comprises hydraulic cylinder means connected to one of the rockable members for rocking the torsion member vertically in contact with the lower links and for permitting said torsion member to move to a position normally out of contact with said links when the implement section is in the field-working position.

22. The invention as set forth in claim 19 wherein said upper link is adjustable to control the attitude of the implement section with respect to the outrigger.

23. The invention as set forth in claim 19 or 22 wherein each implement section includes a centrally located three-point hitch connection, and the upper and lower links are connected to said three-point hitch connection.

24. An implement hitch for supporting two agricultural implements side-by-side in the field, the hitch comprising: a fore-and-aft extending main frame including forward connecting means adapted for connection to a towing vehicle, a fore-and-aft extending hitch member extending rearwardly from the forward connecting means; a ground wheel assembly connected to the main frame and supporting the main frame for forward movement over the ground; first and second support arms, each arm having radially inward and outward ends; means pivotally connecting the radially inward ends of the support arms to the aft end of the main frame for swinging about upright axes between first positions wherein the outward ends extend transversely outwardly in opposite directions from the transverse frame structure and a second position wherein the arms extend forwardly from said frame structure; vertically positionable connecting structure carried by each support arm outwardly of the respective inward end, each connecting structure adapted for receiving one of the agricultural implements; power means for positioning the connecting structure, when said implements are attached, to raise and lower the implements between a lower ground-engaging position and an upper position wherein the weight of the implements is carried primarily by the ground wheel assemblies; and means for pivoting the support arms between the first and second positions to move the implements between a transversely extending field-working position and a folded position, said means including extendable and retractable cylinder means having one end fixedly connected to the main frame and an opposite end movable foreand-aft, a pair of rigid links, each link having a forward end connected for movement fore-and-aft with the cylinder means, and a rearward end, means connecting the rearward ends of the links to the respective arms outwardly of the inward ends of the arms for swinging the arms between the first and second positions as the cylinder means is extended and retracted, and wherein the vertically positionable connecting structure includes two fore-and-aft extending link means connected between the respective support arm and the corresponding implement and rockable about a horizontal axis, transversely extending lift frame means adjustably supported below the link means and operably connected to the power means for adjustment thereby, said lift frame means for contacting the link means and raising and lowering the implements between the lower and upper positions and for supporting the implement on the respective arm when in the upper position, and said power means also for permitting the lift frame to be lowered generally out of contact with the link means when the implement is in the ground-working position for permitting free rocking of the link means with respect to the arm.

25. The invention as set forth in claim 24 wherein the connecting structure comprises a three-point hitch and said two link means comprise two connecting points of said three-point hitch.

26. An implement hitch for supporting two agricultural implements side-by-side in the field, the hitch comprising: a fore-and-aft extending main frame including forward connecting means adapted for connection to a towing vehicle, a fore-and-aft extending hitch member extending rearwardly from the forward connecting means and including a pair of beams diverging rearwardly from the connecting means; a ground wheel assembly connected to the main frame and supporting the main frame for forward movement over the ground; first and second support arms, each arm having radially inward and outward ends; means pivotally connecting the radially inward ends of the support arms to the aft end of the main frame for swinging about upright axes between first positions wherein the outward ends extend transversely outwardly in opposite directions from the transverse frame structure and a second position wherein the arms extend forwardly from said frame structure; vertically positionable connecting structure carried by each support arm outwardly of the respective inward end, each connecting structure adapted for receiving one of the agricultural implements; power means for positioning the connecting structure, when said implements are attached, to raise and lower the implements between a lower ground-engaging position and an upper position wherein the weight of the implements is carried primarily by the ground wheel assemblies; and means for pivoting the support arms between the first and second positions to move the implements between a transversely extending field-working position and a folded position, said means including extendable and retractable cylinder means having one end fixedly connected to the main frame and an opposite end movable fore-and-aft, a pair of rigid links, each link having a forward end connected for movement fore-and-aft with the cylinder means, and a rearward end, means connecting the rearward ends of the links to the respective arms outwardly of the inward ends of the arms for swinging the arms between the first and second positions as the cylinder means is extended and retracted, a fore-and-aft extending slide tube connected to the main frame and centrally located between the diverging beams, a slide member slidably received by the tube for fore-and-aft movement with respect thereto, means for connecting the forward ends of the rigid links to the slide member, and means connecting the cylinder means to the slide member for moving the latter fore-and-aft on the tube as the cylinder means is extended and retracted to move the rigid links.

27. An implement hitch for supporting two agricultural implements side-by-side in the field, the hitch comprising: a fore-and-aft extending main frame including forward connecting means adapted for connection to a towing vehicle, a fore-and-aft extending hitch member extending rearwardly from the forward connecting means and including a pair of beams diverging rearwardly from the connecting means; a ground wheel assembly connected to the main frame and supporting the main frame for forward movement over the ground; first and second support arms, each arm having radially inward and outward ends; a pair of transversely spaced hinge members extending upwardly from the aft ends of the diverging beams and defining upright axes, a connecting structural member connected to the beams forwardly of the hinge members and angling rearwardly and upwardly to, and connected to, the upper ends of the hinge members, and means pivotally connecting the radially inward ends of the support arms to the aft end of the main frame for swinging about said upright axes between first positions wherein the outward ends extend transversely outwardly in opposite directions from the transverse frame structure and a second position wherein the arms extend forwardly from said frame structure; vertically positionable connecting structure carried by each support arm outwardly of the respective inward end, each connecting structure adapted for receiving one of the agricultural implements; power means for positioning the connecting structure, when said implements are attached, to raise and lower the implements between a lower ground-engaging position and an upper position wherein the weight of the implements is carried primarily by the ground wheel assemblies; and means for pivoting the support arms between the first and second positions to move the implements between a transversely extending field-working position and a folded position, said means including extendable and retractable cylinder means having one end fixedly connected to the main frame and an opposite end movable fore-and-aft, a pair of rigid links, each link having a forward end connected for movement fore-and-aft with the cylinder means, and a rearward end, and means connecting the rearward ends of the links to the respective arms outwardly of the inward ends of the arms for swinging the arms between the first and second positions as the cylinder means is extended and retracted.

28. The invention as set forth in claims 27 further comprising a fore-and-aft extending slide tube connected to the main frame, a slide member slidably received by the tube for fore-and-aft movement with respect thereto, means for connecting the forward ends of the rigid links to the slide member, and means connecting the cylinder means to the slide member for moving the latter fore-and-aft on the tube as the cylinder means is extended and retracted to move the rigid links.

29. The invention as set forth in claim 27 wherein the aft ends of the diverging beams and the diagonal structural member define an accommodation space for receiving therein portions of the two implements.

30. A folding agricultural implement comprising: a transport hitch including fore-and-aft extending beam structure, wheel means for supporting the beam structure for forward movement over the ground, connector means located at the fore end of the beam structure and adapted for attachment to a towing vehicle, first and second generally horizontal outriggers hingedly connected adjacent their innermost ends to the aft end of the beam structure for rocking about transversely spaced upright axes, said outriggers rockable between opposite transversely outward positions generally perpendicular to the forward direction and fore-and-aft extending positions adjacent to, and on laterally opposite sides of, the beam structure, first and second transversely extending implement sections; means connecting the implement sections to the respective outriggers; means for rocking the implement sections vertically on the outriggers between lower field-working positions and upper transport positions, wherein in the upper transport positions the implement sections are supported free from ground contact substantially entirely by the corresponding outrigger; and means rocking the outriggers horizontally between the outward and fore-and-aft positions when the implements are in the upper transport positions, said means comprising an extensible and retractable hydraulic cylinder supported on the transport hitch, an elongated slide member supported on the hitch and generally extending in the fore-and-aft direction, slide means connected to the hydaulic cylinder for fore-and-aft movement along the slide member as the cylinder is extended and retracted, first and second link members having forward ends connected to the silde means, said link members including rearward ends pivotally connected to the first and second outriggers, respectively, and wherein the means connecting the implement sections to the outriggers comprises an arm pivotally connected between each outrigger and the corresponding implement, said arm rockable between first and second positions corresponding to the transport and ground-working positions, respectively, of the implement, and wherein the means for rocking the implements vertically comprises lift means for selectively engaging and rocking the arm, said lift means disengageable from said arm when the latter is in the second position for permitting free rocking of the arm.

31. The invention as set forth in claim 30 wherein lift means comprises a pair of transversely spaced plates supported for rocking on opposite sides of the arm, a torsion member located below the arm and connecting the plates for rocking in unison, and cylinder means for rocking the plates and causing said engagement and rocking of the arm.

32. The invention as set forth in claim 31 wherein the cylinder means comprises two hydraulic cylinders connected in parallel and constrained for extension and retraction in unison by the torsion member.

33. A folding agricultural implement comprising: a transport hitch including fore-and-aft extending beam structure, wheel means including a pair of transversely spaced wheels connected to the beam structure and supporting the beam structure for forward movement over the ground, connector means located at the fore end of the beam structure and adapted for attachment to a towing vehicle, first and second generally horizontal outriggers having innermost and outermost ends, means hingedly connecting the outriggers adjacent their innermost ends to the aft end of the beam structure for rocking about transversely spaced upright axes, said outriggers rockable between opposite transversely outward positions generally perpendicular to the forward direction and fore-and-aft extending positions adjacent to, and on laterally opposite sides of, the beam structure, said means hingedly connecting comprising upright hinge means providing substantial and primary vertical support for the outriggers for maintaining the outermost ends of the outriggers a preselected distance above the ground, first and second transversely extending implement sections including ground wheels located on the adjacent innermost ends of the sections and generally centrally located hitch structure; means connecting the hitch structure to the outermost ends of the respective outriggers; means for rocking the implement sections vertically on the outriggers between lower field-working positions and upper transport positions, wherein in the upper transport positions the implement sections are supported free from ground contact substantially entirely by the corresponding outrigger; and means rocking the outriggers horizontally between the outward and fore-and-aft positions, wherein when the implement sections are in the upper transport positions and the outriggers are in the outward positions substantially all the weight of the implement sections are carried via the outriggers and upright hinge means on said pair of wheels.

* * * * *